(12) United States Patent
Kim

(10) Patent No.: US 10,309,773 B2
(45) Date of Patent: Jun. 4, 2019

(54) DEVICE FOR RECOGNIZING OBSTACLE AROUND VEHICLE AND METHOD THEREOF

(71) Applicant: HYUNDAI MOBIS CO., LTD., Yongin-si (KR)

(72) Inventor: Jeong Ku Kim, Yongin-si (KR)

(73) Assignee: Hyundai Mobis Co., Ltd., Yongin-si (KR)

( * ) Notice: Subject to any disclaimer, the term of this patent is extended or adjusted under 35 U.S.C. 154(b) by 167 days.

(21) Appl. No.: 15/216,164

(22) Filed: Jul. 21, 2016

(65) Prior Publication Data

US 2017/0067738 A1    Mar. 9, 2017

(30) Foreign Application Priority Data

Sep. 4, 2015  (KR) .................. 10-2015-0125415

(51) Int. Cl.
| | |
|---|---|
| G01C 3/28 | (2006.01) |
| G01C 3/08 | (2006.01) |
| G05D 1/02 | (2006.01) |
| G01S 17/42 | (2006.01) |
| G01S 17/87 | (2006.01) |
| G01S 17/93 | (2006.01) |

(52) U.S. Cl.
CPC ................ G01C 3/08 (2013.01); G01S 17/42 (2013.01); G01S 17/87 (2013.01); G01S 17/936 (2013.01); G05D 1/024 (2013.01)

(58) Field of Classification Search
None
See application file for complete search history.

(56) References Cited

U.S. PATENT DOCUMENTS

| | | | | |
|---|---|---|---|---|
| 6,477,465 B1* | 11/2002 | McCall | ................. | G01C 21/16 |
| | | | | 701/454 |
| 9,349,055 B1* | 5/2016 | Ogale | ................ | G06K 9/00791 |
| 2004/0016870 A1* | 1/2004 | Pawlicki | ............... | B60W 30/18 |
| | | | | 250/208.1 |

OTHER PUBLICATIONS

John A. Hancock, Laser Intensity-Based Obstacle Detection and Tracking, The Robotics Institute Carnegie Mellon University Pittsburgh, Pennsylvania 15213, Jan. 26, 1999, pp. i-168.*

(Continued)

*Primary Examiner* — Tung S Lau
(74) *Attorney, Agent, or Firm* — H.C. Park & Associates, PLC

(57) ABSTRACT

Provided are a device and method for recognizing an obstacle around a vehicle. The device includes a distance sensor configured to generate sensing information regarding each of a plurality of signals by outputting the plurality of signals to an area spaced a predetermined distance from the front of the vehicle, a signal processing unit configured to extract the sensing information regarding signals determined as sensing an obstacle by individually performing vertical ground filtering and horizontal ground filtering on the sensing information regarding each of the plurality of signals, a signal mixer configured to mix the sensing information extracted by performing vertical ground filtering and the sensing information extracted by performing horizontal ground filtering, and an obstacle recognition unit configured to recognize the obstacle using a result of mixing the extracted sensing information.

8 Claims, 12 Drawing Sheets

(56) References Cited

OTHER PUBLICATIONS

Klas Hedenberg, Obstacle Detection for Driverless Trucks in Industrial Environments, Publisher: Halmstad University Press, 2014, 92 pages.*

* cited by examiner

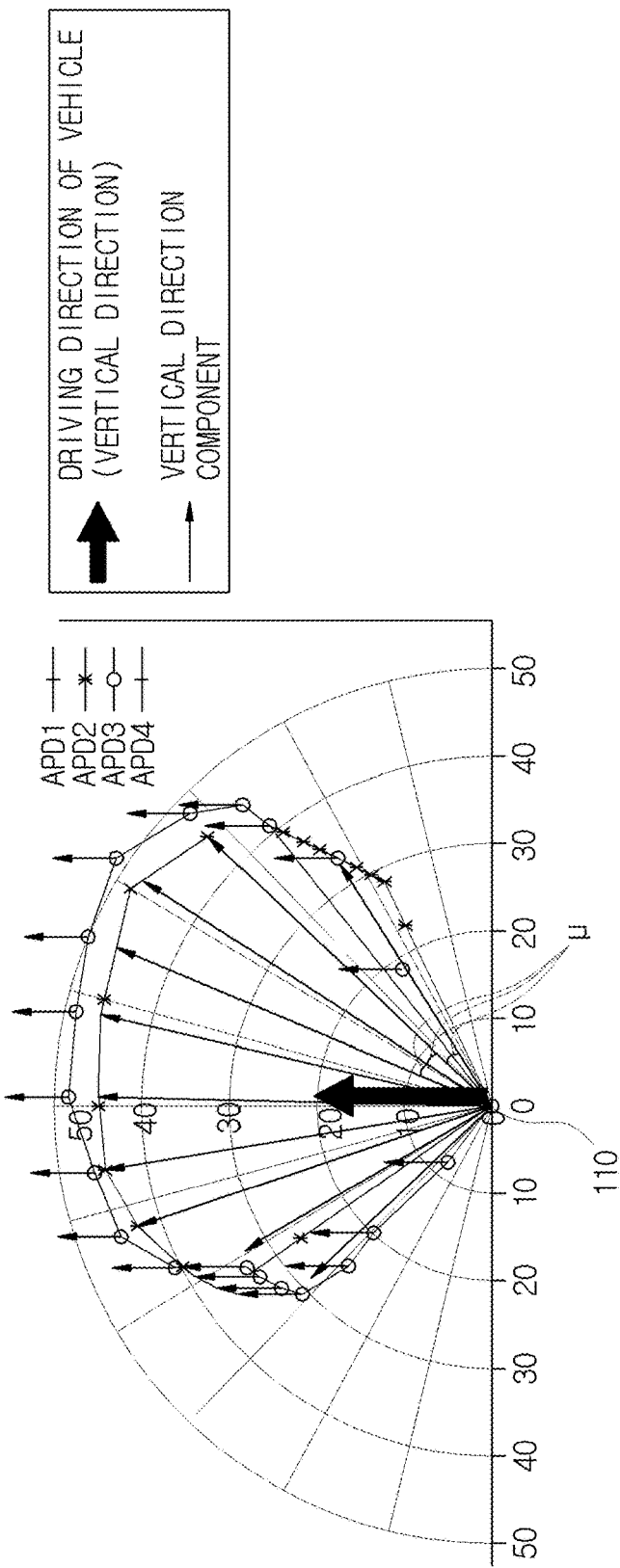

DEVICE FOR RECOGNIZING OBSTACLE AROUND VEHICLE AND METHOD THEREOF

CROSS-REFERENCE TO RELATED APPLICATION

This application claims priority from and the benefits of Korean Patent Application No. 10-2015-0125415, filed on Sep. 4, 2015, which is incorporated herein by reference for all purposes as if fully set forth herein.

BACKGROUND

Field

The present invention relates to a device and method for recognizing an obstacle around a vehicle, and more particularly, to a device and method capable of improving performance of recognizing an obstacle around a vehicle.

Discussion of the Background

In general, for safe driving of an autonomous vehicle, it is very important to detect an obstacle in a driving direction and not to collide against the obstacle based on information collected regarding the detected obstacle.

For example, when driving on the road, the autonomous vehicle should drive in a manner so that it does not collide against a sidewalk protruding higher than the road. Thus, detecting a curb which is a boundary stone between the road and the sidewalk is needed. The curb is an important sign on the road. Thus, accurate detection of a curb is useful in the field of autonomous vehicles.

In a method of detecting a curb according to the related art, the curb is detected mainly using sensor information obtained from side surfaces thereof. That is, in the related art, the curb is detected using a feature of distance sensor information which sharply changes at portions of the curb since the side surfaces of the curb are perpendicular to the ground.

However, the amount of the sensor information obtained from the side surfaces of the curb is relatively small. Thus, when only the sensor information obtained from the side surfaces of the curb is used, the performance of detecting the curb is likely to be influenced by external causes, sensor noise, or the like. Furthermore, it is difficult to recognize a curb distant from a vehicle. For example, side surfaces of a curb may be short, e.g., in the range of 6 cm to 15 cm, and thus a relatively small amount of information may be obtained from the side surfaces. Thus, when a distance to a curb is large, an amount of information enough to differentiate between the ground and the curb is difficult to acquire. Accordingly, detecting a curb distant from a vehicle is difficult according to the related art.

In another example, for safe driving, the autonomous vehicle detects an obstacle using signal information measured by a distance measurement sensor. In detail, the autonomous vehicle detects an obstacle by separating information regarding the ground on the road and information regarding an obstacle on the road from the measured signal information and extracting only three-dimensional (3D) information, i.e., the information regarding the obstacle, by removing distance information estimated as the information regarding the ground.

However, since the information regarding the obstacle is extracted by removing all the distance information estimated as information regarding the ground (low-level height information) from the signal information measured by the distance measurement sensor, it is likely that a curb having a low height and the like will be considered the ground, and thus information thereof will be removed. Furthermore, height information regarding an obstacle distant from the vehicle may be measured as having a low level and may be thus removed together with the information regarding the ground.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present disclosure are directed to a device and method for recognizing an obstacle around a vehicle, which are capable of improving the performance of obstacle recognition by preventing information sensed from an obstacle from being determined as a result of sensing the ground and excluded during obstacle recognition.

Additional features of the disclosure will be set forth in the description which follows, and, in part, will be apparent from the description, or may be learned by practice of the inventive concept.

An exemplary embodiment discloses a device for recognizing an obstacle around a vehicle. The device includes a distance sensor configured to generate sensing information regarding each of a plurality of signals by outputting the plurality of signals to an area spaced a predetermined distance from the front of the vehicle, a signal processing unit with at least one processor configured to extract the sensing information regarding signals determined as sensing an obstacle by individually performing vertical ground filtering and horizontal ground filtering on the sensing information provided by each of the plurality of signals, a signal mixer with at least one processor configured to mix the sensing information extracted by performing vertical ground filtering and the sensing information extracted by performing horizontal ground filtering, and an obstacle recognition unit with at least one processor configured to recognize the obstacle using a result of mixing the extracted sensing information.

Another exemplary embodiment discloses a method of recognizing an obstacle around a vehicle. The method includes generating sensing information regarding each of a plurality of signals by outputting the plurality of signals to an area spaced a predetermined distance from the front of the vehicle, extracting the sensing information regarding signals determined as sensing an obstacle by individually performing vertical ground filtering and horizontal ground filtering on the sensing information regarding each of the plurality of signals, mixing the sensing information extracted by performing vertical ground filtering and the sensing information extracted by performing horizontal ground filtering, and recognizing the obstacle in the front area using a result of mixing the extracted sensing information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the inventive concept.

FIG. 3 is a diagram illustrating a case in which a distance sensor outputs signals in a horizontal direction, according to an exemplary embodiment.

DETAILED DESCRIPTION OF THE ILLUSTRATED EMBODIMENTS

Figure 1:
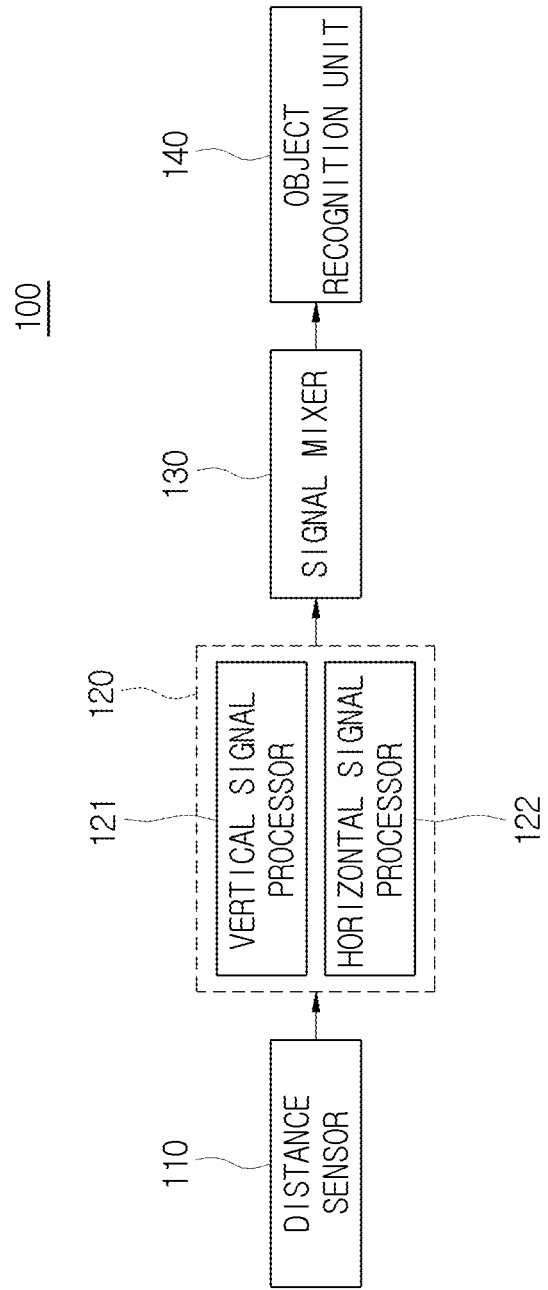
FIG. 1 is a block diagram of a device for recognizing an obstacle around a vehicle, according to an exemplary embodiment.

Exemplary embodiments will hereinafter be described with reference to the accompanying drawings. Exemplary embodiments may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements. In the drawings, the size and relative sizes of regions and components may be exaggerated for clarity.

When an element is referred to as being "on," "connected to," or "positioned on" another element or layer, it may be directly on, connected to, or positioned on the other element or intervening elements may be present. When, however, an element is referred to as being "directly on," "directly connected to," or "directly positioned on" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," "left," "right," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "have," "having," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, embodiments of the present disclosure will be described in detail with reference to the accompanying drawings.

FIG. 1 is a block diagram of a device 100 for recognizing an obstacle around a vehicle, according to an exemplary embodiment.

Referring to FIG. 1, the device 100 includes a distance sensor 110, a signal processing unit 120, a signal mixer 130, and an obstacle recognition unit 140.

The distance sensor 110 may be installed in a vehicle to generate sensing information by sensing an area spaced a predetermined distance from the front of the vehicle. In this case, the distance sensor 110 may be a laser sensor sensing a direction toward the ground and a front space. In addition, the distance sensor 110 may be one of various distance measurement sensors which measures a distance, e.g., an infrared sensor, a LIDAR sensor, etc. Hereinafter, for convenience of explanation, it is assumed that the distance sensor 110 is a laser sensor.

The distance sensor 110 may simultaneously sense a plurality of points, and senses a plurality of points on the ground and a plurality of points in the front space. Thus, the distance sensor 110 may generate sensing information of a plurality of layers, e.g., n layers. Here, n denotes a natural number which is greater than or equal to '2'. In this case, the distance sensor 110 senses the direction toward the ground to sense a curb which is a boundary stone between the road and a sidewalk, and senses the front space to sense whether an obstacle is present in a driving path of the vehicle.

Hereinafter, it is assumed that the distance sensor 110 senses four points using four sensors (e.g., first to fourth sensors). That is, n=4.

Figure 2:
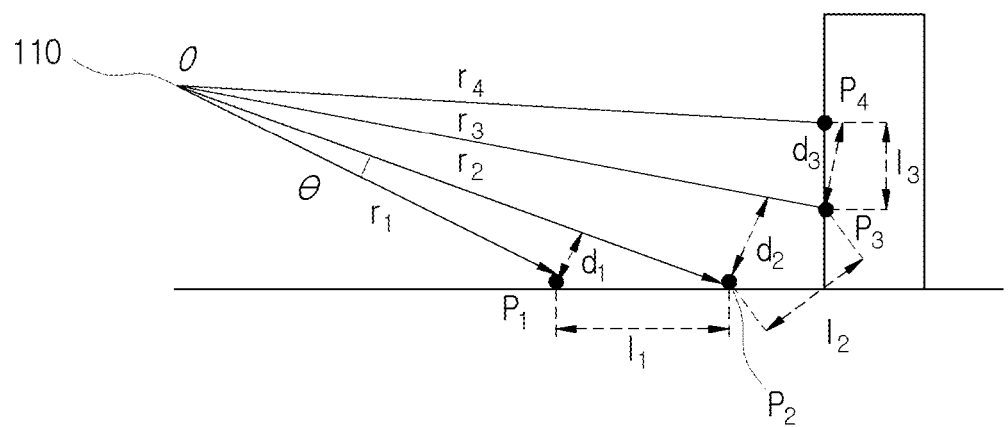
FIG. 2 is a diagram illustrating a case in which a distance sensor outputs signals in a vertical direction, according to an exemplary embodiment.

FIG. 2 illustrates a case in which the distance sensor 110 senses four points p1, p2, p3, and p4, according to an exemplary embodiment of the present disclosure. Referring to FIG. 2, the distance sensor 110 senses the four points p1, p2, p3, and p4 by outputting four laser beams to the ground and a front space. In this case, the distance sensor 110 may senses the four points p1, p2, p3, and p4 by changing output angles α, β, γ, and δ between a vertical line perpendicular to the position thereof (the origin) and directions of output signals. However, the number n of regions to be sensed by the distance sensor 110 and values of laser output angles may be variously set. To this end, the distance sensor 110 includes a plurality of sensors having different laser output angles α, β, γ, and δ. The number of the regions to be sensed by the distance sensor 110 may be expressed as a plurality of layers.

Included angles between adjacent signals output from two adjacent sensors (first included angles, second included angles, and third included angles) may be equal to a predetermined angle θ. That is, all a first included angle (β-α) between a first signal which is output from a first sensor and senses the first point p1 and a second signal which is output from a second sensor and senses the second point p2, a second included angle (γ-β) between the second signal and a third signal which is output from a third sensor and senses the third point p3, and a third included angle (δ-γ) between the third signal and a fourth signal which is output from a fourth sensor and senses the fourth point p4 are equal to the predetermined angle θ.

Alternatively, the included angles between the adjacent signals (the first included angles, the second included angles, and the third included angles) may be different from one another. Information regarding such included angle may be stored beforehand.

Hereinafter, it is assumed that all the included angles between the adjacent signals (the first included angles, the second included angles, and the third included angles) are equal to the predetermined angle θ.

Each of the plurality of sensors of the distance sensor 110 may output a plurality of signals at a predetermined angle within a radius of 180 degrees or less in a horizontal direction. FIG. 3 is a diagram illustrating a case in which one of the plurality of sensors of the distance sensor 110 outputs signals in the horizontal direction, according to an exemplary embodiment. In this case, angles between adjacent signals may be equal to a predetermined angle μ. Alternatively, the angles between the adjacent signals may be different predetermined angles μ1, μ2, . . . , to μm-1. In this case, information regarding the same or different angles may be stored beforehand. Hereinafter, it is assumed that all these angles are equal to the predetermined angle μ.

For example, the distance sensor 110 senses a plurality of points by outputting first_1 to first_m signals at a predetermined angle or less via the first sensor in the horizontal direction. Here, m is a natural number greater than '1' and may denote the number of signals output from one of the plurality of sensors in the horizontal direction. The second sensor of the distance sensor 110 outputs second_1 to second_m signals, the total number m of which is the same as that of the first_1 to first_m signals output from the first sensor. Similarly, the third sensor may output third_1 to third_m signals and the fourth sensor may output fourth_1 to fourth_m signals while rotating in the horizontal direction. In this case, the first_m signal, the second_m signal, the third_m signal, and the fourth_m signal are respectively output from the first to fourth sensors in the same direction at different output angles α, β, γ, and δ.

The signal processing unit 120 may receive sensing information regarding signals output from the distance sensor 110, and determines whether the ground is sensed by the output signals on the basis of distance values included in the sensing information. The signal processing unit 120 may extract the sensing information regarding a signal determined to be an obstacle while excluding the sensing information regarding a signal determined to be the ground.

To this end, the signal processing unit 120 may include a vertical signal processor 121 and a horizontal signal processor 122.

A process of performing vertical ground filtering by a vertical signal processor according to an exemplary embodiment of the present disclosure will be described in detail with reference to FIG. 4A and FIG. 4B below.

Figure 4A:
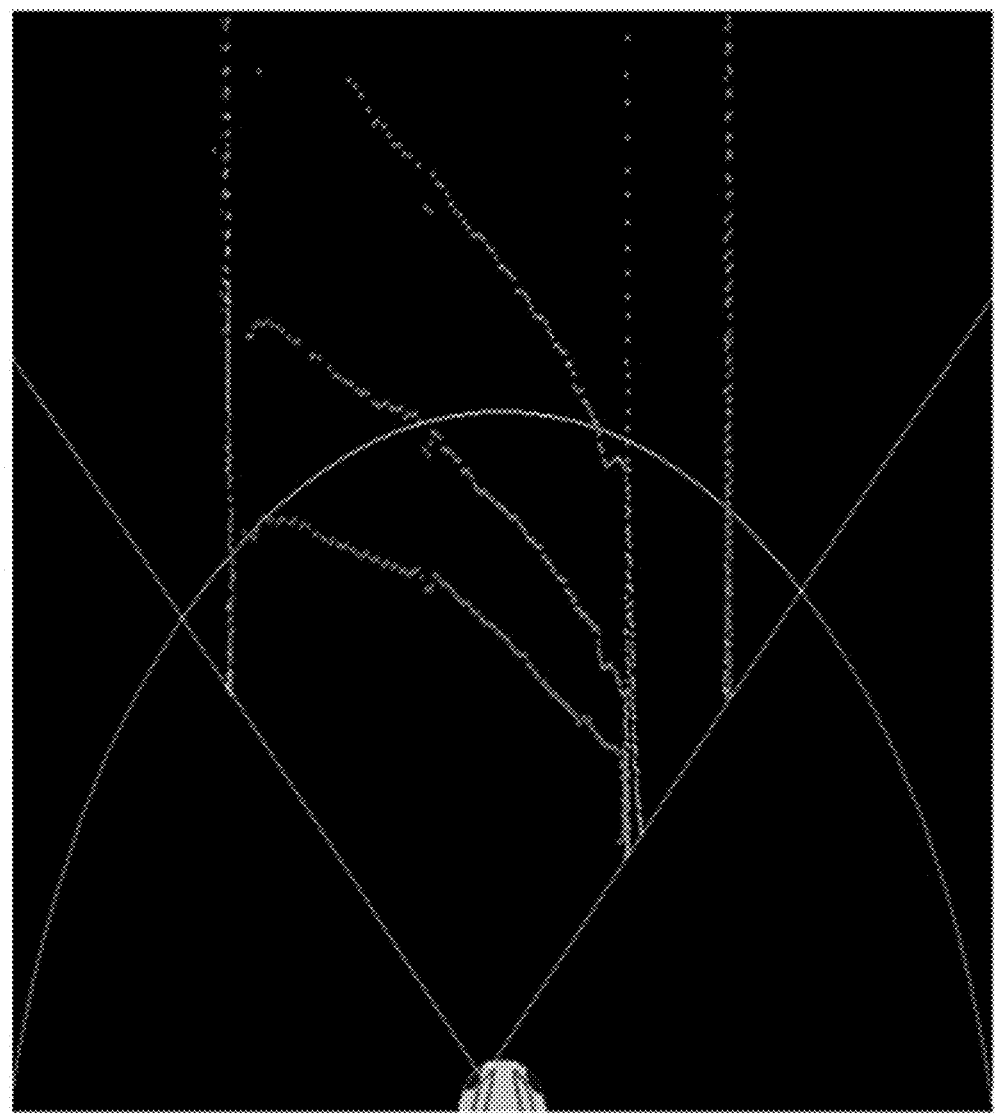
FIG. 4A and FIG. 4B are a reference diagram illustrating vertical ground filtering performed by a vertical signal processor, according to an exemplary embodiment.
Figure 4B:
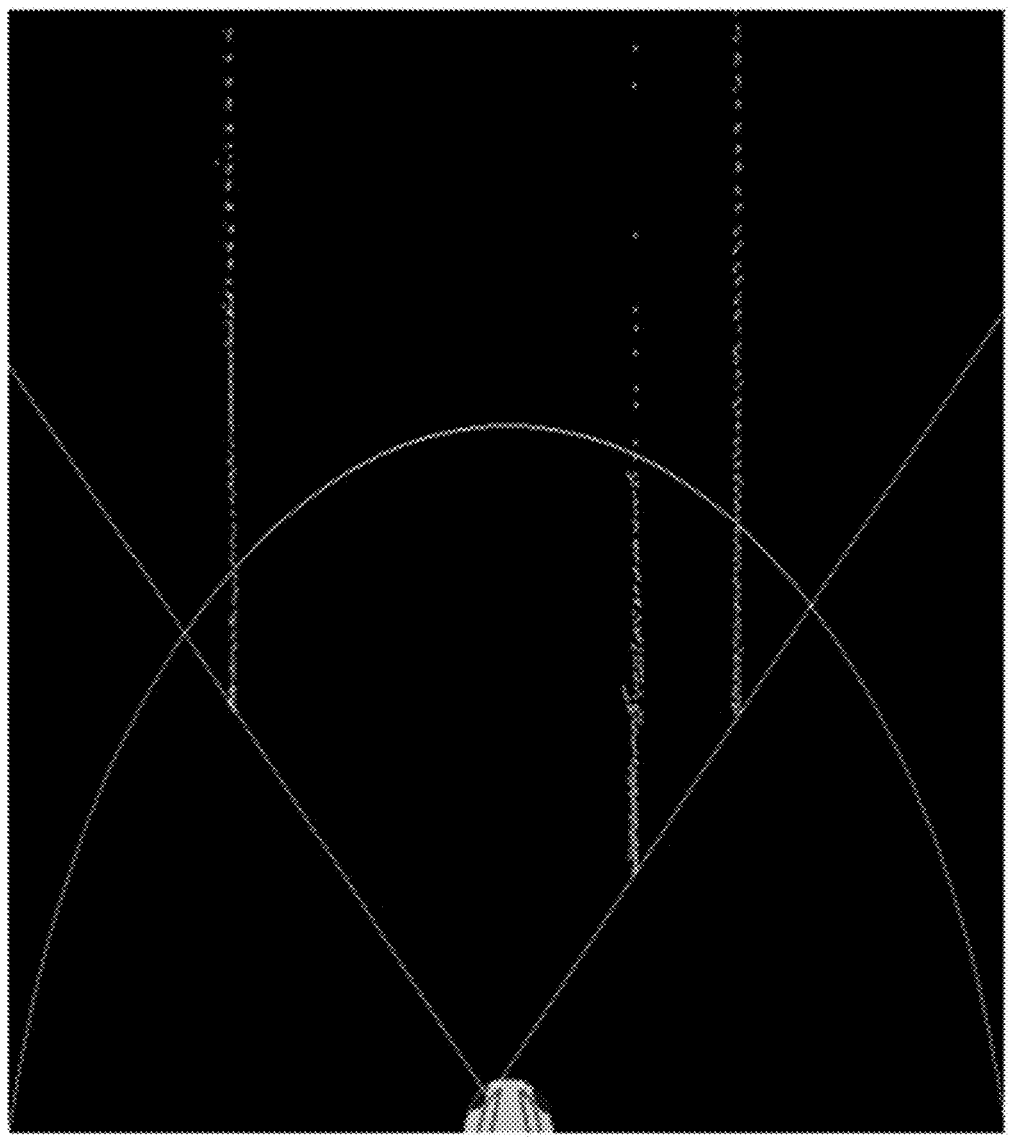

FIG. 4A and FIG. 4B are a reference diagrams illustrating vertical ground filtering performed by a vertical signal processor, according to an exemplary embodiment.

The vertical signal processor 121 may perform vertical ground filtering using signals output from a plurality of sensors at the same horizontal angle. In this case, the vertical signal processor 121 receives distance values of respective sensed points with respect to a vertical signal from the distance sensor 110, and determines whether the ground is sensed by the output signals on the basis of the distance values.

Here, the vertical signal processor 121 may check whether the ground is sensed by four signals on a vertical line using the first_1 to fourth_1 signals of FIG. 3, and checks whether the ground is sensed by four signals on the vertical line by using the first_2 to fourth_2 signals of FIG. 3. Similarly, whether the ground is sensed by four signals on the vertical line is checked using the first_m to fourth_m signals of FIG. 3.

Although exemplary embodiments will now be described with reference to the first_3 to fourth_3 signals of FIG. 3 output from a plurality of sensors at the same angle in the horizontal direction, these embodiments are also applicable to a plurality of signals output from the plurality of sensors (e.g., the first_1 to fourth_1 signals, the first_2 to fourth_2 signals, . . . , and the first_m to fourth_m signals).

First, the vertical signal processor 121 may calculate a distance l between points sensed by two sensors on the basis of a distance r and an included angle θ of points sensed by adjacent signals. Furthermore, the vertical signal processor 121 may calculate a height d of a triangle formed by two adjacent radar signals. The vertical signal processor 121 may compare the distance l and the height d with each other to determine whether the ground or an obstacle is sensed by the two adjacent signals.

For example, referring to FIG. 2, the vertical signal processor 121 may calculate a first distance l1 between the first point p1 and the second point p2 using a first distance r1 and a second distance r2 sensed respectively by the first_3 signal and the second_3 signal and the included angle θ. In this case, the first distance l1 may be calculated by Equation 1 below.

$$l_1 = \sqrt{r_1^2 + r_2^2 - 2r_1 r_2 \cos\theta} \qquad \text{[Equation 1]}$$

In addition, the vertical signal processor 121 may calculate a first height d1 from the first distance r1 and the included angle θ. In this case, the first height d1 may be calculated by Equation 2 below using a formula of a trigonometric function.

$$d_1 = r_1 \cos \theta \quad \text{[Equation 2]}$$

The vertical signal processor 121 may compare the first distance l1 and the first height d1 calculated using Equations 1 and 2 with each other, and determine that the ground is sensed by the first_3 signal and the second_3 signal when an error between the first distance l1 and the first height d1 is greater than or equal to a predetermined value.

Similarly, referring to FIG. 2, the vertical signal processor 121 may determine that the ground is sensed by the second_3 signal and the third_3 signal when an error between a second distance l2 and a second height d2 calculated from the second distance r2 and a third distance r3 sensed respectively by the second_3 signal and the third_3 signal and the included angle θ is greater than or equal to the predetermined value. Furthermore, referring to FIG. 2, the vertical signal processor 121 may calculate a third distance l3 and a third height d3 from the third distance r3 and a fourth distance r4 sensed respectively by the third_3 signal and the fourth_3 signal and the included angle θ. In this case, when an error between the third distance l3 and the third height d3 is less than the predetermined value, the vertical signal processor 121 determines that an obstacle is sensed by the third_3 signal and the fourth_3 signal.

The vertical signal processor 121 may extract only sensing information regarding the obstacle from sensing information regarding the ground and the sensing information regarding the obstacle which is determined through the above process while excluding the sensing information regarding the ground. For example, the vertical signal processor 121 may exclude sensing information regarding the first_3 and second_3 signals which are determined as sensing the ground, and extract sensing information regarding the third_3 and fourth_3 signals which are determined as sensing the obstacle.

After vertical ground filtering is performed by the vertical signal processor 121 as described above, only the sensing information regarding the obstacle as illustrated in FIG. 4B may be extracted from sensing information obtained by sensing both the ground and the obstacle as illustrated in FIG. 4A.

The horizontal signal processor 122 may perform horizontal ground filtering using a plurality of signals output from one of the plurality of sensors of the distance sensor 110 at an angle in the horizontal direction. In this case, the horizontal signal processor 122 receives distance values of respective sensed points from the distance sensor 110, and determines whether an obstacle is sensed by a corresponding signal on the basis of the distance values.

Here, the horizontal signal processor 122 may check whether the obstacle is sensed by m signals on a horizontal line by using the first_1 to first_m signals, and may check whether the ground is sensed by m signals on the horizontal line by using the second_1 to second_m signals. Similarly, the horizontal signal processor 122 may check whether the ground is sensed by m signals on the horizontal line using the fourth_m to fourth_m signals.

Although horizontal ground filtering performed using the second_1 to second_m signals output from a random sensor (e.g., the second sensor) at an angle in the horizontal direction will be described below, horizontal ground filtering may be performed using a plurality of signals output from the other sensors (e.g., the first, third, and fourth sensors).

Horizontal ground filtering performed by the horizontal signal processor 122 according to an exemplary embodiment will be described in detail with reference to FIG. 5 below.

Figure 5:
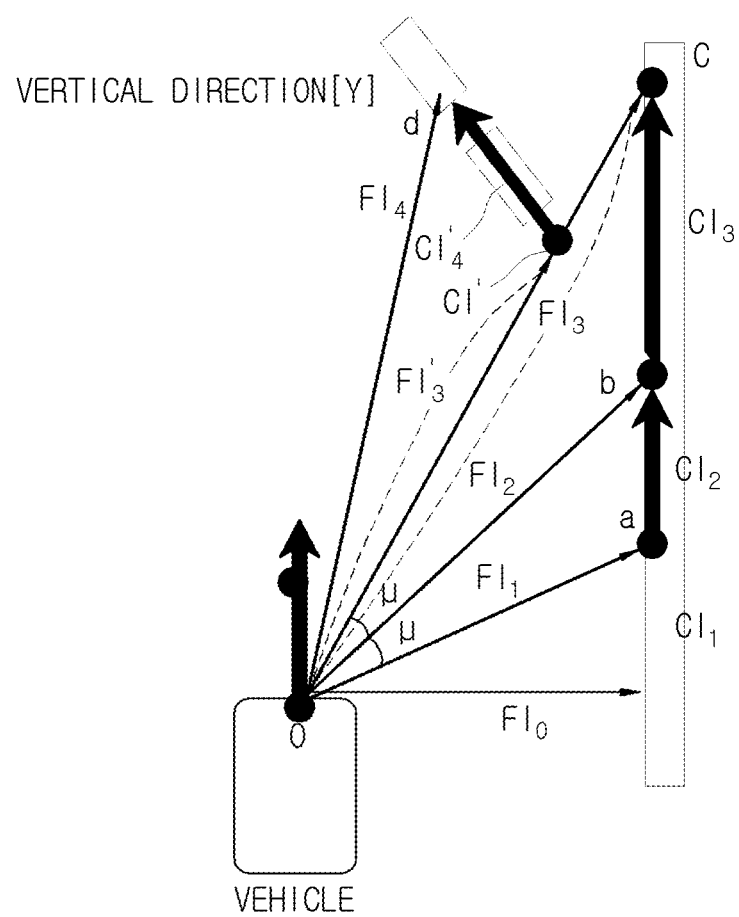
FIG. 5 is a reference diagram illustrating horizontal ground filtering performed by a horizontal signal processor, according to an exemplary embodiment.

FIG. 5 is a reference diagram illustrating a process of performing horizontal ground filtering by a horizontal signal processor, according to an exemplary embodiment of the present disclosure.

As illustrated in FIG. 5, the horizontal signal processor 122 checks the directivities Cl1, Cl2, Cl3, . . . , and Clm between points a, b, c, . . . , and m sensed respectively by a plurality of signals output from one of the plurality of sensors of the distance sensor 110. For example, the horizontal signal processor 122 may check the directivity Cl2 between the points a and b by generating a triangle using a second_1 signal Fl1, a second_2 signal Fl2, and a set angle μ between these signals. In this case, the horizontal signal processor 122 may determine whether the directivity Cl2 between the points a and b is parallel to a driving direction of a vehicle (vertical direction). Here, it may be determined that the directivity Cl2 is parallel to the driving direction of the vehicle when an error between the directivity Cl2 and the driving direction of the vehicle is a predetermined inclination (e.g., 10 degrees) or less.

Furthermore, the horizontal signal processor 122 may check the directivity Cl3 between the points b and c by generating a triangle using the second_2 signal Fl2, a second_3 signal Fl3, and a set angle μ between these signals. The horizontal signal processor 122 may check whether the directivity Cl3 between the points b and c is parallel to the driving direction of the vehicle within the predetermined inclination.

As described above, when the directivity between two points is parallel to the driving direction of the vehicle within the range of the predetermined inclination, the horizontal signal processor 122 may determine that an obstacle (e.g., a curb) is sensed by these two signals.

In FIG. 5, when a point c' is sensed by the second_3 signal Fl3, the horizontal signal processor 122 may determine that the directivity Cl2' between the points b and c' is not parallel to the driving direction of the vehicle within the predetermined inclination. In this case, the horizontal signal processor 122 may determine that the ground is sensed by the second_2 signal Fl2 and the second_3 signal Fl3'.

Additionally, in FIG. 5, when the point c' is sensed by the second_3 signal Fl3' and the point d is sensed by a second_4 signal Fl4, the horizontal signal processor 122 may determine that the directivity Cl3' between the points c' and d is not parallel to the driving direction of the vehicle within the range of the predetermined inclination. In this case, the horizontal signal processor 122 may determine that the ground is sensed by the second_3 signal Fl3' and the second_4 signal Fl4.

The horizontal signal processor 122 may extract only sensing information of the obstacle from sensing information of the ground and the sensing information of the obstacle determined through the above process. For example, as illustrated in FIG. 5, when the directivity Cl2 between the points a and b and the directivity Cl3 between the points b and c are parallel to the driving direction of the vehicle within the range of the predetermined inclination, the horizontal signal processor 122 determines that the obstacle is sensed and thus extracts sensing information of the second_1 signal Fl1 to the second_3 signal Fl3'. In contrast, as illustrated in FIG. 5, when the directivity Cl3' between the points c' and d is not parallel to the driving direction of the vehicle, the horizontal signal processor 122 may determine that the ground is sensed and excludes sensing information of the second_3 signal Fl3' and the second_4 signal Fl4.

A case in which the directivity Cl2 between the points a and b and the directivity Cl3 between the points b and c are parallel to the driving direction of the vehicle within the range of the predetermined inclination, it may be determined that an obstacle is sensed by the second_1 signal Fl1 to the second_3 signal Fl3'. This will be described as an example below.

The signal mixer 130 may mix sensing information regarding an obstacle extracted by the vertical signal processor 121 and sensing information regarding the obstacle extracted by the horizontal signal processor 122.

For example, the signal mixer 130 mixes sensing information regarding the third_3 signal and the fourth_3 signal determined as sensing the obstacle and thus extracted by the vertical signal processor 121, and sensing information regarding the second_1 signal to the second_3 signal determined as sensing the obstacle and thus extracted by the horizontal signal processor 122. Thus, the sensing information regarding the second_3 signal determined as sensing the ground and thus excluded by the vertical signal processor 121 may be determined as sensing the obstacle by the horizontal signal processor 122 and thus restored.

Similarly, even if a signal among all the first_1 signal to the fourth_m signal is determined as sensing the ground and thus excluded by the vertical signal processor 121, sensing information of this signal may be restored when this signal is determined as sensing the obstacle by the horizontal signal processor 122. That is, all signals determined as sensing the obstacle by at least one of the vertical signal processor 121 and the horizontal signal processor 122 among all the first_1 signal to the fourth_m signal may be restored by the signal mixer 130.

FIGS. 6A, 6B, 6C, and 6D are a diagram illustrating results obtained through operations of elements of a device for recognizing an obstacle around a vehicle, according to an exemplary embodiment of the present disclosure.

Figure 6A:
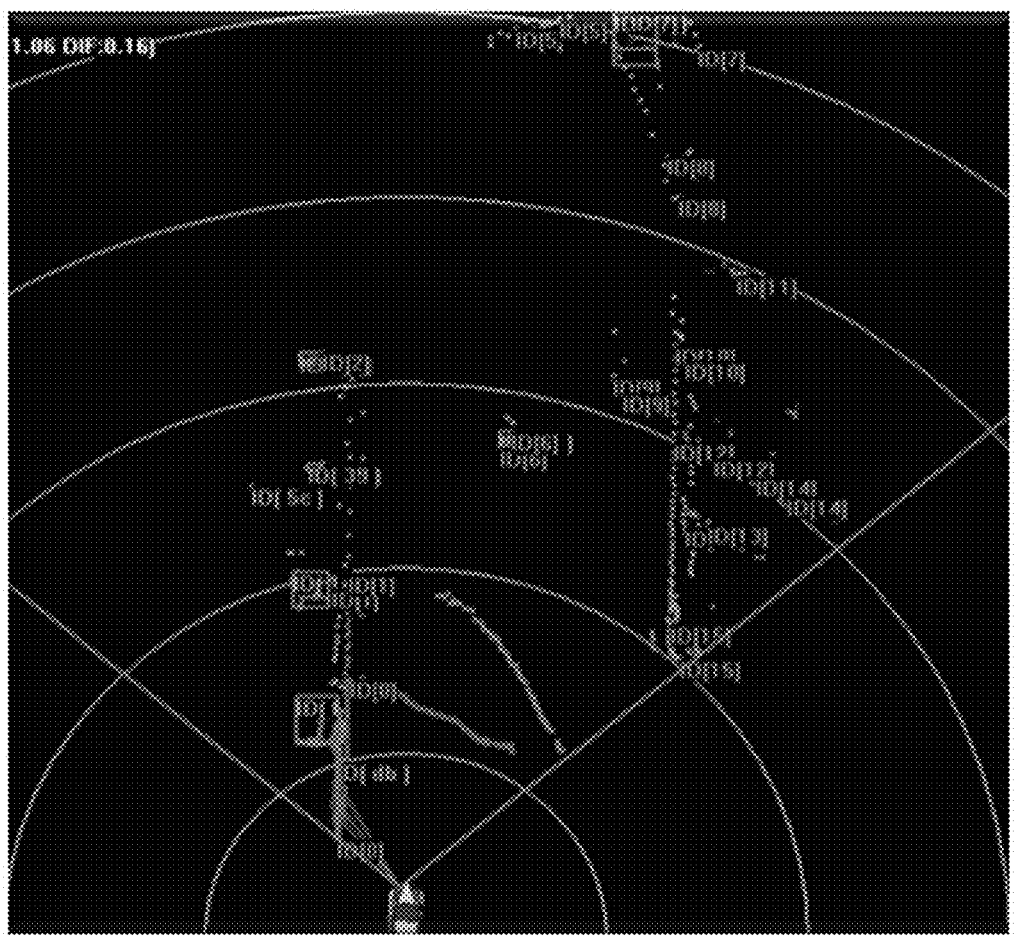
FIGS. 6A, 6B, 6C, and 6D are diagrams illustrating results obtained through operations of elements of a device for recognizing an obstacle around a vehicle, according to an exemplary embodiment.
Figure 6B:
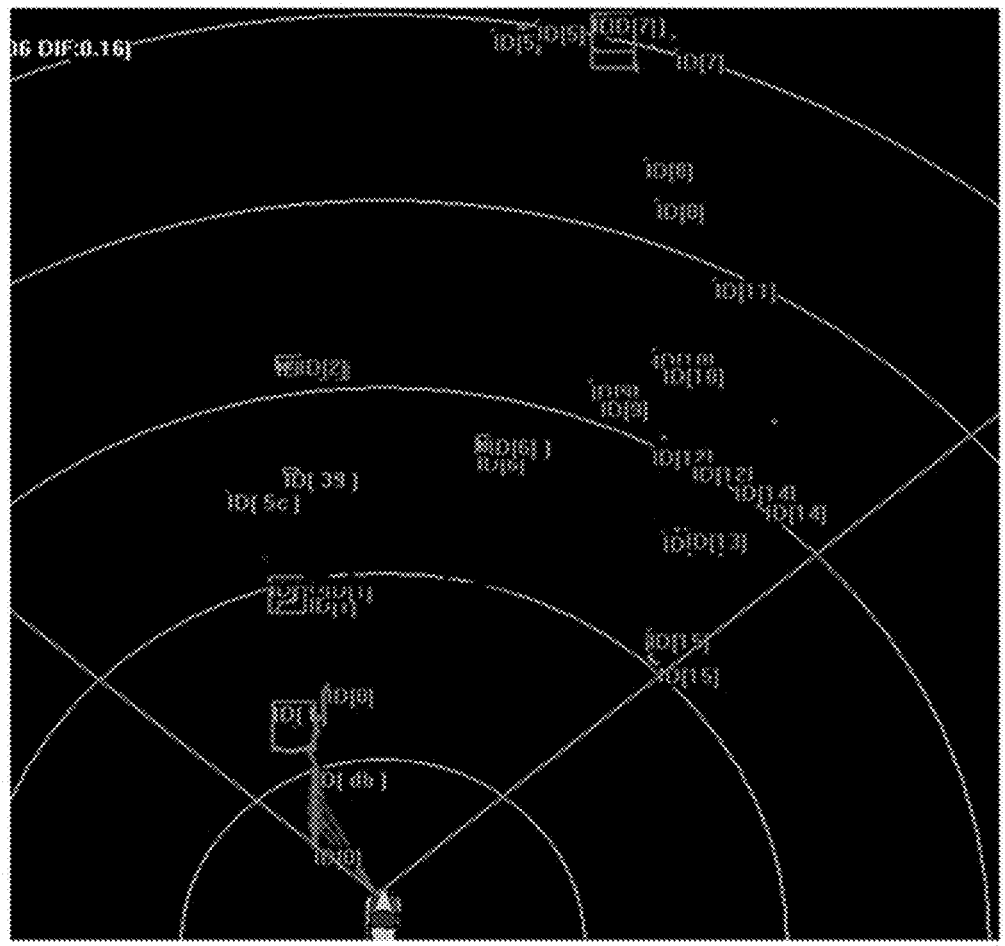

For example, as illustrated in FIG. 6A, sensing information regarding an obstacle among the results of sensing the ground and obstacles around a vehicle by the distance sensor 110 while excluding sensing information determined by the vertical signal processor 121 as the result of sensing the ground is illustrated in FIG. 6B. Sensing information regarding an obstacle among the results of sensing the ground and the obstacle of FIG. 6A while excluding sensing information determined by the horizontal signal processor 122 as the result of sensing the ground is illustrated in FIG. 6C.

Figure 6C:
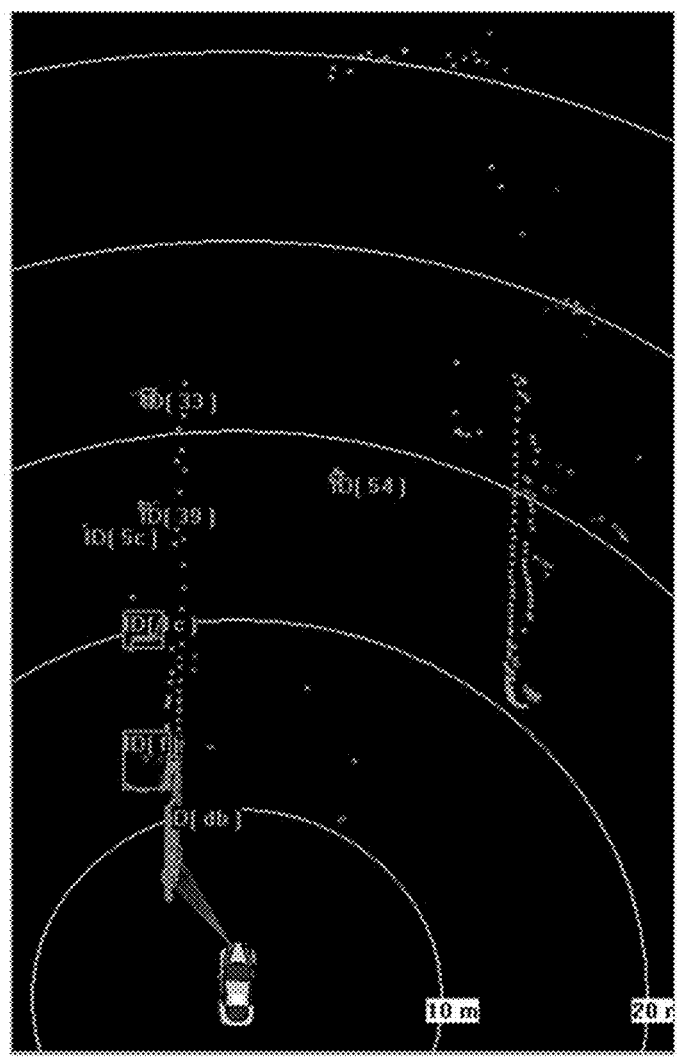
Figure 6D:
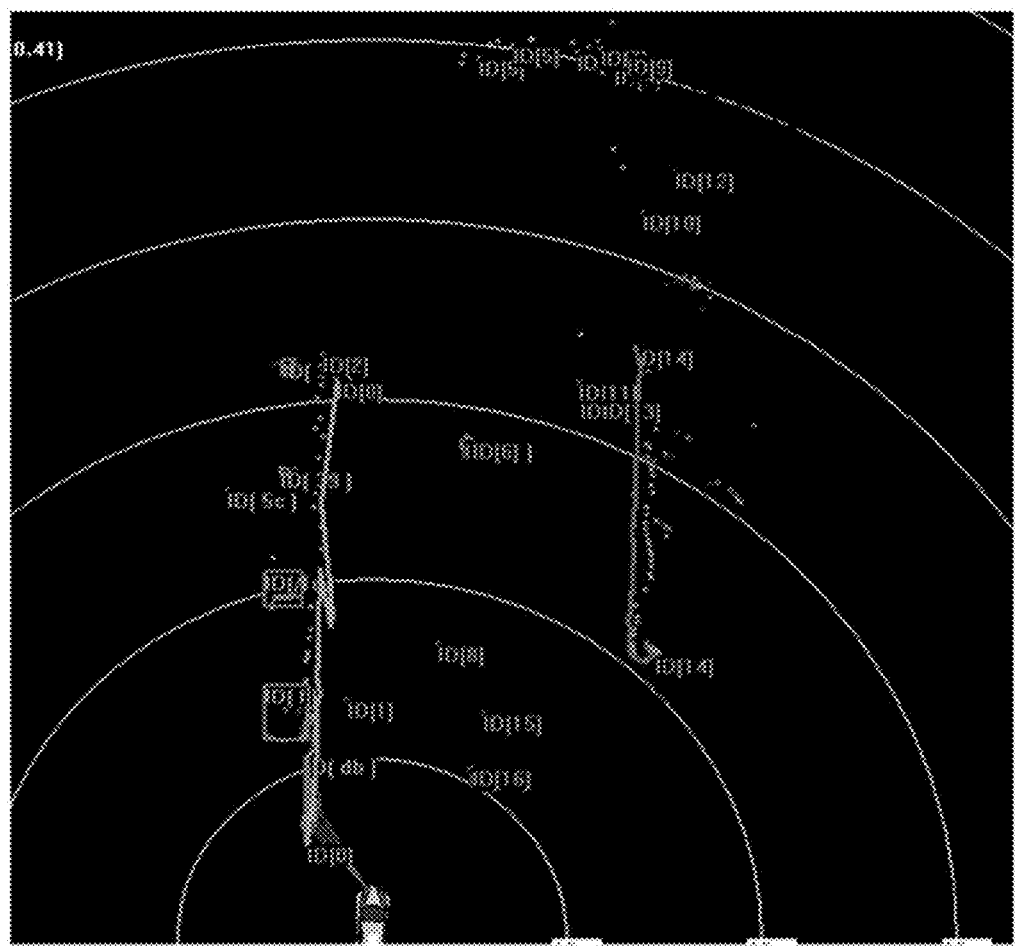

The signal mixer 130 may derive a result of FIG. 6D by mixing the sensing information regarding the obstacle of FIG. 6B and the sensing information regarding the obstacle of FIG. 6C.

The obstacle recognition unit 140 may recognize the obstacles around the vehicle on the basis of a result of mixing the sensing information regarding the obstacles by the signal mixer 130. In this case, the result of mixing the sensing information regarding the obstacles by the signal mixer 130 excludes sensing information regarding a signal determined as sensing the ground. Thus, the obstacle recognition unit 140 may recognize the shapes of the obstacles around the vehicle except the ground on the basis of the result of mixing the sensing information regarding the obstacles by the signal mixer 130.

As described above, according to an exemplary embodiment of the present disclosure, sensing information determined as sensing an obstacle through at least one of vertical ground filtering and horizontal ground filtering is used during obstacle recognition. Thus, even if sensing information obtained by sensing an obstacle is erroneously determined as sensing the ground during vertical ground filtering and thus excluded during obstacle recognition, the sensing information may be restored through horizontal ground filtering, thereby improving the performance of obstacle recognition.

Furthermore, according to an exemplary embodiment of the present disclosure, a loss of sensing information excluded through vertical ground filtering may be minimized through horizontal ground filtering, thereby lowering a probability of erroneous obstacle recognition and ground recognition.

Figure 7:
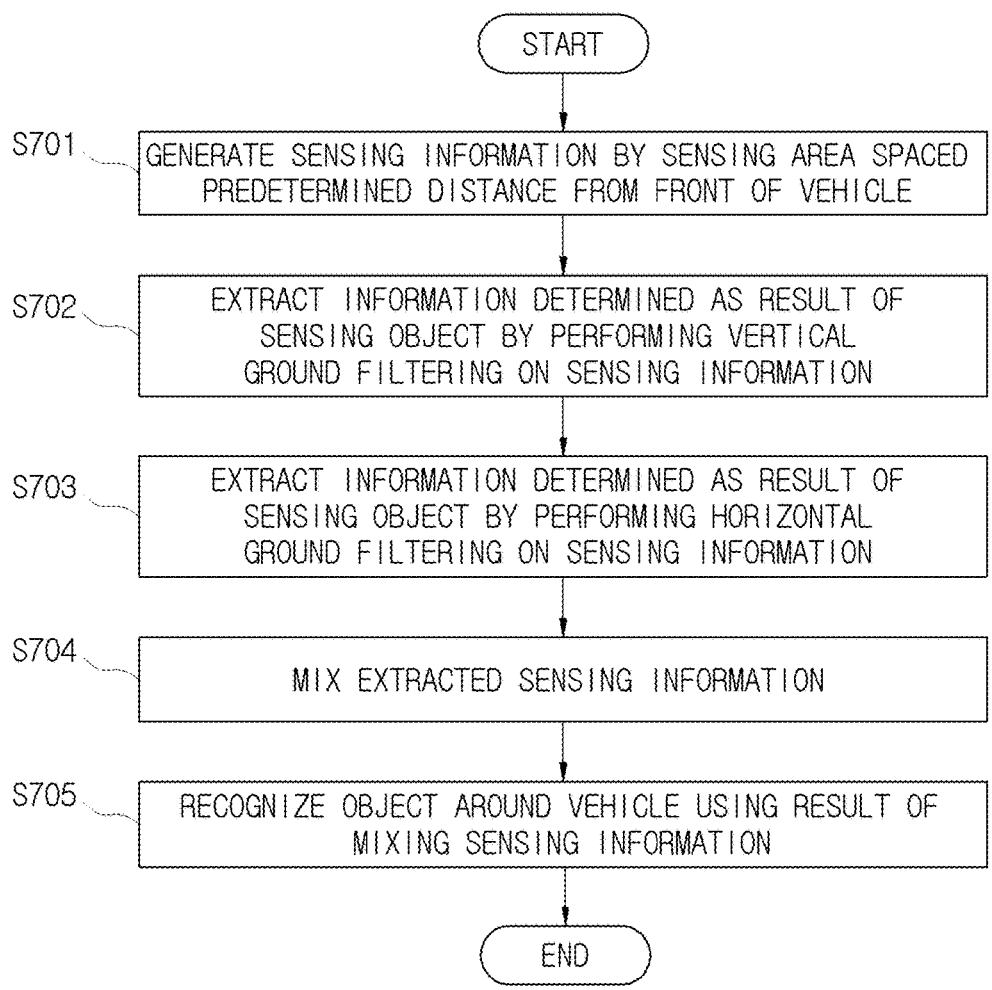
FIG. 7 is a flowchart of a method of recognizing an obstacle around a vehicle according to an exemplary embodiment.

FIG. 7 is a flowchart of a method of recognizing an obstacle around a vehicle according to an exemplary embodiment.

Here, unless otherwise mentioned, it is assumed that the method of FIG. 7 is performed by the device 100 for recognizing an obstacle around a vehicle according to an exemplary embodiment.

First, sensing information may be generated by sensing an area spaced a predetermined distance from the front of the vehicle (operation S701).

In this case, a direction of the ground and a front space may be sensed using a laser sensor. Alternatively, one of various distance measurement sensors such as an infrared sensor, a LIDAR sensor, etc. may be used. Hereinafter, for convenience of explanation, it is assumed that a laser sensor is used.

The device 100 may sense a plurality of points at the same time, and sense a plurality of points on the ground and a plurality of points in the front space. Thus, the device 100 may generate sensing information regarding a plurality of layers (n layers). Here, n denotes a natural number which is greater than or equal to two (2). In this case, the device 100 senses the direction of the ground to sense a curb which is a boundary stone between the road and a sidewalk, and senses the front space to sense whether an obstacle is present in a driving path of the vehicle. Hereinafter, it is assumed that the distance sensor 110 senses four points (i.e., n=4) using four sensors (first to fourth sensors).

For example, the device 100 may output four laser beams to the ground and the front space to sense four points p1, p2, p3, and p4 as illustrated in FIG. 2. In this case, the four points p1, p2, p3, and p4 may be sensed by changing output angles $\alpha$, $\beta$, $\gamma$, and $\delta$ between directions of output signals and a vertical line with respect to a position of a laser sensor (the origin). However, any number n of regions to be sensed and laser output angles may be variously set. To this end, a plurality of laser sensors may have different laser output angles $\alpha$, $\beta$, $\gamma$, and $\delta$. Furthermore, the regions to be sensed may be expressed as a plurality of layers.

Furthermore, included angles between two adjacent signals output from two adjacent sensors (first included angles, second included angles, and third included angles) may be equal to a predetermined angle $\theta$. That is, all a first included angle ($\beta$-$\alpha$) between a first signal which is output from the first sensor and senses the first point p1 and a second signal which is output from the second sensor and senses the second point p2, a second included angle ($\gamma$-$\beta$) between the second signal and a third signal which is output from the third sensor and senses the third point p3, and a third included angle ($\delta$-$\gamma$) between the third signal and a fourth signal which is output from the fourth sensor and senses the fourth point p4 may be equal to the predetermined angle $\theta$.

Alternatively, the included angles between the adjacent signals (e.g., the first included angles, the second included angles, and the third included angles) may be different from one another. Information regarding such included angles may be stored beforehand.

Hereinafter, it is assumed that all the included angles between adjacent signals (e.g., the first included angles, the second included angles, and the third included angles) are equal to the predetermined angle θ.

Furthermore, each of the laser sensors of the device 100 may output a plurality of laser signals at a predetermined angle within a radius of 180 degrees or less in a horizontal direction. In this case, angles between adjacent signals may be equal to a predetermined angle μ as illustrated in FIG. 3. Alternatively, the angles between the adjacent signals may be different angles μ1, μ2, . . . , μm−1. In this case, information regarding the same or different angles may be stored beforehand. Hereinafter, it is assumed that all angles between adjacent signals are equal to the predetermined angle μ.

For example, the plurality of points are sensed by outputting first_1 to first_m signals at a predetermined angle or less via the first sensor of the device 100 in the horizontal direction. Here, m denotes a natural number greater than one (1), and may denote the number of signals output from one sensor in the horizontal direction. Furthermore, the second sensor of the device 100 outputs second_1 to second_m signals, the total number m of which is the same as that of the first_1 to first_m signals output from the first sensor. Similarly, the third sensor may output third_1 to third_m signals and the fourth sensor may output fourth_1 to fourth_m signals while rotating in the horizontal direction. In this case, the first_m signal, the second_m signal, the third_m signal, and the fourth_m signal transmitted from the first to fourth sensors have different output angles α, β, γ, and δ but are output in the same direction.

Sensing information determined as a result of sensing an obstacle may be extracted by performing vertical ground filtering on sensing information regarding signals output from the plurality of sensors at the same angle in the horizontal direction among the output signals in operation S701 (operation S702).

In this case, whether the ground is sensed by signals output on the basis of distance values of the respective sensed points with respect to a vertical signal may be determined.

Here, the device 100 checks whether the ground is sensed by four signals on a vertical line by using the first_1 to fourth_1 signals, and checks whether the ground is sensed by four signals on the vertical line by using the first_2 to fourth_2 signals. Similarly, the device 100 may check whether the ground is sensed by four signals on the vertical line using the first_m to fourth_m signals.

Although exemplary embodiments will now be described with respect to, for example, the first_3 to fourth_3 signals output at the same angle from the plurality of sensors in the horizontal direction, the embodiments are applicable to a plurality of signals (the first_1 to fourth_1 signals, the first_2 to fourth_2 signals, . . . , and the first_m to fourth_m signals) output from the plurality of sensors.

First, the device 100 may calculate a distance l between points sensed by two sensors using a distance r and an included angle θ with respect to points sensed by adjacent signals. Furthermore, the device 100 may calculate a height d of a triangle formed by two adjacent radar signals. The device 100 may compare the distance l and the height d with each other to determine whether the ground or an obstacle is sensed by the two adjacent signals.

For example, in FIG. 2, a first distance l1 between the first point p1 and the second point p2 is calculated using a first distance r1, a second distance r2, and the included angle θ sensed by the first_3 signal and the second_3 signal. In this case, the first distance l1 may be calculated by Equation 1 above.

In addition, the device 100 may calculate a first height d1 from the first distance r1 and the included angle θ. In this case, the first height d1 may be calculated by Equation 2 based on the formula of the trigonometric function above.

The device 100 may compare the first distance l1 and the first height d1 calculated by Equations 1 and 2 with each other, and determines that the ground is sensed by the first_3 signal and the second_3 signal when an error between the first distance l1 and the first height d1 is greater than or equal to a predetermined value.

Similarly, in FIG. 2, the vertical signal processor 121 of the device 100 may determine that the ground is sensed by the second_3 signal and the third_3 signal when an error between a second distance l2 and a second height d2 calculated from the second distance r2, a third distance r3, and the included angle θ sensed by the second_3 signal and the third_3 signal is greater than or equal to the predetermined value.

Furthermore, in FIG. 2, the device 100 may calculate a third distance l3 and a third height d3 from the third distance r3, a fourth distance r4, and the angle θ sensed by the third_3 signal and the fourth_3 signal. In this case, when an error between the third distance l3 and the third height d3 is less than the predetermined value, the device 100 determines that an obstacle is sensed by the third_3 signal and the fourth_3 signal.

The vertical signal processor 121 may extract only sensing information regarding an obstacle from sensing information regarding the ground and the sensing information regarding the obstacle which is determined through the above process. For example, the sensing information regarding the first_3 and second_3 signals determined as sensing the ground is excluded, and the sensing information regarding the third_3 and fourth_3 signals determined as sensing an obstacle is extracted.

When vertical ground filtering is performed by the device 100 as described above, only the sensing information regarding the obstacle as illustrated in FIG. 4B may be extracted from the sensing information obtained by sensing both the ground and the obstacle as illustrated in FIG. 4A.

Furthermore, the device 100 may extract sensing information determined as a result of sensing an obstacle by performing horizontal ground filtering on the sensing information regarding the plurality of signals output from one of the plurality of sensors in the horizontal direction in operation S701 (operation S703).

In this case, whether the ground is sensed by output signals on the basis of distance values of sensed points with respect to a horizontal signal is determined.

The device 100 may check whether the obstacle is sensed by m signals on the horizontal line using the first_1 to first_m signals, and checks whether the ground is sensed by m signals on the horizontal line using the second_1 to second_m signals. Similarly, the device 100 may check whether the ground is sensed by m signals on the horizontal line using the fourth_1 to fourth_m signals.

Although horizontal ground filtering performed by the device 100 using the second_1 to second_m signals output from a random one sensor (e.g., the second sensor) in the horizontal direction will be described below, the performing of horizontal ground filtering is also applicable to a plurality of signals output from each of the other sensors (the first, third, and fourth sensors).

As illustrated in FIG. 5, the device 100 may check the directivities Cl1, Cl2, Cl3, . . . , and Clm between points a, b, c, . . . , and m sensed by a plurality of signals output from one of the plurality of sensors. For example, the directivity Cl2 between the points a and b may be checked by forming a triangle by the second_1 signal Fl1, the second_2 signal Fl2, and the predetermined angle μ therebetween. In this case, whether the directivity Cl2 between the points a and b is parallel to a driving direction of the vehicle (a vertical direction) may be checked. Here, it may be determined that the directivity Cl2 and the driving direction are parallel to each other when an error therebetween is a predetermined inclination (e.g., 10 degrees) or less.

Furthermore, the device 100 may check the directivity Cl3 between the points b and c by forming a triangle by the second_2 signal Fl2, the second_3 signal Fl3, and the predetermined angle μ therebetween. In this case, whether the checked directivity Cl3 between the points b and c is parallel to the driving direction of the vehicle within a range of the predetermined inclination may be checked.

As described above, when the directivity between two points is parallel to the driving direction of the vehicle within the range of the predetermined inclination, it may be determined that an obstacle (a curb or the like) is sensed by two signals.

Referring to FIG. 5, when the point c' is sensed by the second_3 signal Fl3, it may be determined that the directivity Cl2' between the points b and c' is not parallel to the driving direction of the vehicle within the range of the predetermined inclination. In this case, it may be determined that the ground is sensed by the second_2 signal Fl2 and the second_3 signal Fl3'.

Furthermore, referring to FIG. 5, when the point c' is sensed by the second_3 signal Fl3' and the point d is sensed by the second_4 signal Fl4, it may be determined that the directivity Cl3' between the points c' and d is not parallel to the driving direction of the vehicle within the range of the predetermined inclination. In this case, it may be determined that the ground is sensed by the second_3 signal Fl3' and the second_4 signal Fl4.

The device 100 may extract only the sensing information regarding the obstacle from the sensing information regarding the ground and the sensing information regarding the obstacle determined as described above. For example, when the directivity Cl2 between the points a and b and the directivity Cl3 between the points b and c are parallel to the driving direction of the vehicle within the range of the predetermined inclination as illustrated in FIG. 5, it may be determined that the obstacle is sensed and thus the sensing information regarding the second_1 signal to the second_3 signal may be extracted. In contrast, when that directivity Cl3' between the points c' and d is not parallel to the driving direction of the vehicle within the range of the predetermined inclination as illustrated in FIG. 5, it may be determined that the ground is sensed and thus the sensing information regarding the second_3 signal and the second_4 signal may be excluded.

A case in which it is determined that an obstacle is sensed by the second_1 signal to the second_3 signal as the directivity Cl2 between the points a and b and the directivity Cl3 between the points b and c are parallel to the driving direction of the vehicle within the range of the predetermined inclination will be described as an example below.

The sensing information regarding the obstacle extracted in operation S702 and the sensing information regarding the obstacle extracted in operation S703 may be mixed (operation S704).

For example, the device 100 mixes sensing information regarding the third_3 signal and the fourth_3 signal determined as a result of sensing an obstacle and thus extracted during vertical ground filtering in S702 and sensing information regarding the second_1 signal to the second_3 signal determined as a result of sensing an obstacle and thus extracted during horizontal ground filtering in operation S703. Thus, the sensing information regarding the second_3 signal determined as a result of sensing the ground and excluded during vertical ground filtering may be determined as a result of sensing the obstacle and restored during horizontal ground filtering.

Similarly, even if a signal among all the first_1 signal to the fourth_m signal is determined as a result of sensing the ground and thus excluded during vertical ground filtering, sensing information regarding thereof may be restored when the sensing information is determined as a result of sensing the obstacle during horizontal ground filtering. That is, all signals determined as a result of sensing the obstacle through at least one of vertical ground filtering and horizontal ground filtering among all the first_1 signal to the fourth_m signal may be restored.

For example, referring to FIG. 6A, a result of excluding sensing information determined as a result of sensing the ground from results of sensing the ground and obstacles around a vehicle by laser sensors through vertical ground filtering may be as illustrated in FIG. 6B. Further, referring to FIG. 6A, a result of excluding sensing information determined as a result of sensing the ground from the results of sensing the ground and the obstacles around a vehicle by laser sensors through horizontal ground filtering is as illustrated in FIG. 6C.

The device 100 may derive a result of FIG. 6D by mixing sensing information regarding the obstacle of FIG. 6B and sensing information regarding the obstacle of FIG. 6C.

The device 100 may recognize the obstacles around the vehicle on the basis of a result of mixing the sensing information regarding the obstacles in operation S704 (operation S705).

In this case, the result of mixing the sensing information regarding the obstacles excludes the sensing information regarding the signals determined as sensing the ground and thus the shape of the obstacles around the vehicle except the ground may be recognized using the result of mixing the sensing information regarding the obstacles.

According to an exemplary embodiment of the present disclosure, sensing information determined as a result of sensing an obstacle through at least one of vertical ground filtering and horizontal ground filtering may be used for obstacle recognition. Thus, even if sensing information obtained by sensing an obstacle is determined as a result of sensing the ground during vertical ground filtering and thus excluded during obstacle recognition, the sensing information may be restored through horizontal ground filtering, thereby improving the performance of obstacle recognition.

Furthermore, according to an exemplary embodiment of the present disclosure, a loss of sensing information excluded through vertical ground filtering may be minimized through horizontal ground filtering, thereby lowering a probability of erroneous obstacle recognition and ground recognition.

Figure 8:
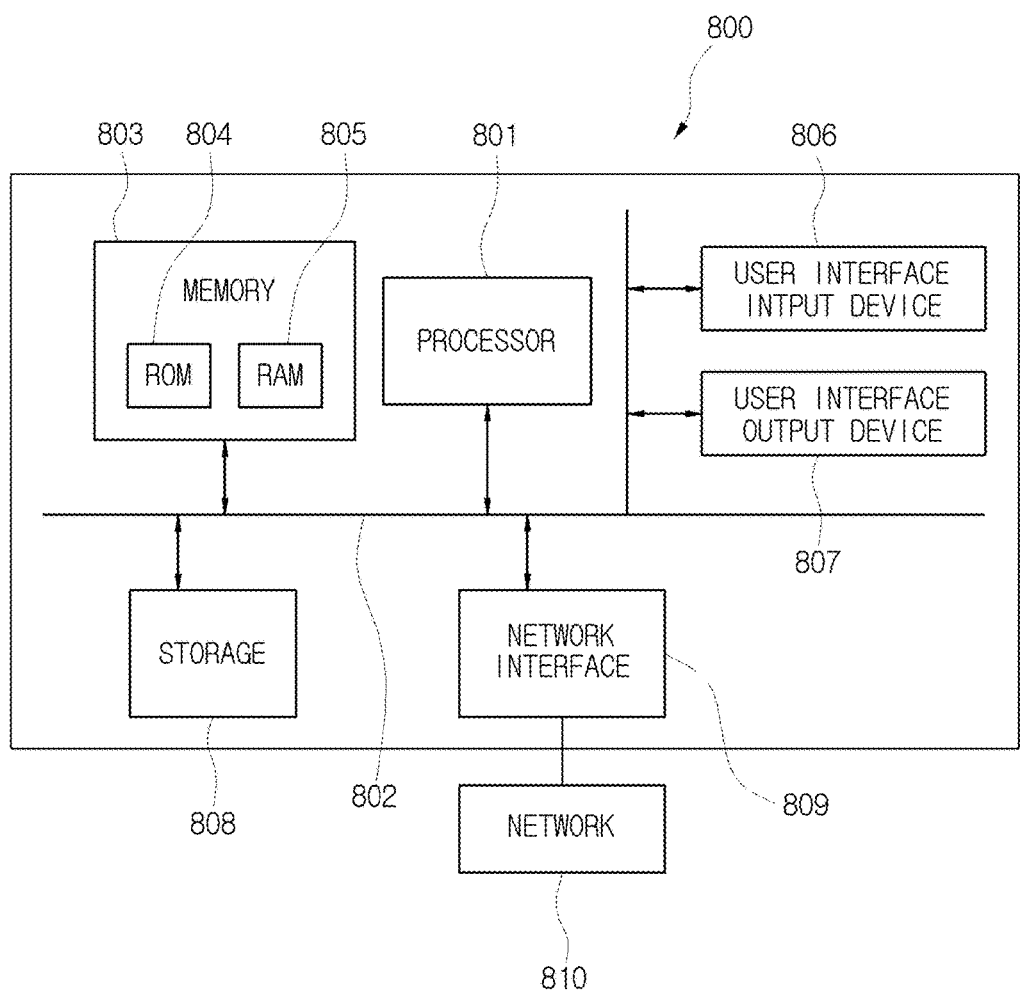
FIG. 8 is a block diagram illustrating a computer system for use with exemplary embodiments.

FIG. 8 is a block diagram illustrating a computer system for use with exemplary embodiments.

As shown in FIG. 8, a computer system 800 may include one or more of a processor 801, a memory 803, a user input device 806, a user output device 807, and a storage 808, each of which communicates through a bus 802. The computer system 800 may also include a network interface 809 that is coupled to a network 810. The processor 801 may be a central processing unit (CPU) or a semiconductor device that executes processing instructions stored in the memory 803 and/or the storage 808. The memory 803 and the storage 808 may include various forms of volatile or non-volatile storage media. For example, the memory may include a read-only memory (ROM) 804 and a random access memory (RAM) 805.

The computer system 800, device 100, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, computer system 800, device 100, and/or one or more components thereof may include or otherwise be associated with one or more memories (not shown) including code (e.g., instructions) configured to cause the computer system 800, device 100, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A device for recognizing an obstacle around a vehicle, the device comprising:

a distance sensor configured to generate sensing information regarding each of a plurality of signals by outputting the plurality of signals to an area spaced a predetermined distance from the front of the vehicle;

a signal processing unit comprising at least one processor configured to extract the sensing information regarding signals determined as sensing an obstacle by individually performing vertical ground filtering and horizontal ground filtering on the sensing information provided by each of the plurality of signals;

a signal mixer comprising at least one processor configured to mix the sensing information extracted by performing vertical ground filtering and the sensing information extracted by performing horizontal ground filtering;

an obstacle recognition unit comprising at least one processor configured to recognize the obstacle using a result of mixing the extracted sensing information, wherein the sensing information includes direct range information;

wherein the signal processing unit comprises:

a vertical signal processor configured to extract a first sensing information from among the signals output from the distance sensor at the same position and at the same horizontal angle and different vertical angles, and filter out the sensing information regarding signals determined as sensing the ground; and a horizontal signal processor configured to extract a second sensing information from among the signals output from the distance sensor at the same position and at the same vertical angle and different horizontal angles, and filter out the sensing information regarding signals determined as sensing the ground; and wherein the horizontal signal processor is configured to check whether the obstacle is sensed by two random signals adjacent in a horizontal direction among the signals output from the distance sensor at the same position and at the same vertical angle and the different horizontal angles by comparing a directivity between points sensed by the two random signals with a driving direction of the vehicle.

2. The device of claim 1, wherein the vertical signal processor is configured to calculate a height of a triangle formed by points sensed by two random signals adjacent in a vertical direction among the signals output from the distance sensor at the same position and at the same horizontal angle and the different vertical angles and a vertical angle between the two random signals, and check whether the obstacle is sensed by the two random signals by comparing a distance between the points sensed by the two random signals with the height.

3. The device of claim 1, wherein, when the directivity between the points sensed by the two random signals is parallel to the driving direction of the vehicle within a range of a predetermined inclination, the horizontal signal processor is configured to determine that the obstacle is sensed by the two random signals.

4. The device of claim 2, wherein, when an error between the distance and the height is less than a predetermined value, the vertical signal processor is configured to determine that the obstacle is sensed by the two random signals.

5. A method of recognizing an obstacle around a vehicle, the method comprising:

generating, by a distance sensor, sensing information regarding each of a plurality of signals by outputting the plurality of signals to an area spaced a predetermined distance from the front of the vehicle;

extracting, by a signal processing unit comprising at least one processor, the sensing information regarding signals determined as sensing an obstacle by individually performing vertical ground filtering and horizontal ground filtering on the sensing information regarding each of the plurality of signals, wherein the signal processing unit further comprises a vertical signal processor and a horizontal signal processor;

mixing, by a signal mixer comprising at least one processor, the sensing information extracted by performing vertical ground filtering and the sensing information extracted by performing horizontal ground filtering;

recognizing, by an obstacle recognition unit comprising at least one processor, the obstacle in the front area using a result of mixing the extracted sensing information, wherein the sensing information includes direct range information generated by a distance sensor, wherein the extracting of the sensing information comprises:

extracting, by the vertical signal processor, first sensing information among the signals output at the same position and at the same horizontal angle and different vertical angles, while filtering out the sensing information regarding signals determined as sensing the ground; and extracting, by the horizontal signal processor, second sensing information among the signals output at the same position and at the same vertical angle and different horizontal angles, while filtering out the sensing information regarding signals determined as sensing the ground; and wherein the extracting of the second sensing information comprises checking, by the horizontal signal processor, whether the obstacle is sensed by two random signals adjacent in a horizontal direction among the signals output at the same position and at the same vertical angle and different horizontal angles by comparing a directivity between points sensed by the two random signals with a driving direction of the vehicle.

6. The method of claim 5, wherein the extracting of the first sensing information comprises:

calculating a height of a triangle formed by points sensed by two random signals adjacent in a vertical direction among the signals output at the same position and at the same horizontal angle and the different vertical angles and a vertical angle between the two random signals; and checking whether the obstacle is sensed by the two random signals by comparing a distance between the points sensed by the two random signals with the height.

7. The method of claim 5, wherein the extracting of the second sensing information comprises determining that the obstacle is sensed by the two random signals when the directivity between the points sensed by the two random signals is parallel to the driving direction of the vehicle within a range of a predetermined inclination.

8. The method of claim 6, wherein the checking of whether the obstacle is sensed comprises determining that the obstacle is sensed by the two random signals when an error between the distance and the height is less than a predetermined value.

* * * * *